United States Patent [19]
Plank et al.

[11] 3,740,482
[45] June 19, 1973

[54] TIME DIVISION MULTIPLEX TELEPHONE SYSTEM WITH PARALLEL TRANSMISSION

[75] Inventors: Karl-Ludwig Plank, Oberroden; Michael Schwarzer, Frankfurt am Main-Schwanheim, both of Germany

[73] Assignee: Telefonbau und Normalzeit GmbH, Frankfurt am Main, Germany

[22] Filed: Oct. 26, 1971

[21] Appl. No.: 192,304

Related U.S. Application Data

[63] Continuation of Ser. No. 833,833, April 14, 1969, abandoned.

[52] U.S. Cl. .......................... 179/15 A, 179/15 BW
[51] Int. Cl. .............................................. H04j 3/04
[58] Field of Search .................. 179/15 A, 15 BW, 179/15 BC, 15 AA, 15 AT, 15.55 R

[56] References Cited

UNITED STATES PATENTS

| | | | |
|---|---|---|---|
| 2,629,771 | 2/1953 | Anderson | 179/15.55 R |
| 3,435,148 | 3/1969 | Yoshine | 179/15 BW |

*Primary Examiner*—Ralph D. Blakeslee
*Attorney*—Erwin Salzer

[57] ABSTRACT

A time division telephone system adapted to greatly increase the message pathways that can be established between two central offices. Each message to be transmitted is sampled sequentially, these samples are stored temporarily at the transmitting end of the system, simultaneously transmitted by transmitting means including a plurality of buses to the receiving end of the system, and are there reconstituted in the original sampling sequence and supplied to a receiving set.

3 Claims, 3 Drawing Figures

INVENTORS
Karl-Ludwig PLANK
Michael SCHWARZER
By
[signature]
their ATTORNEY

INVENTORS
Karl-Ludwig PLANK
Michael SCHWARZER
By
their ATTORNEY

TIME DIVISION MULTIPLEX TELEPHONE SYSTEM WITH PARALLEL TRANSMISSION

This is a continuation of application Ser. No. 833,833, which is now abandoned.

BACKGROUND OF INVENTION

According to Shannon's theorem the sampling rate must be about twice the highest frequency transmitted. During the interval of time between two samplings transmitted along a message pathway including a bus, a finite number of samples derived from other sources of intelligence may be transmitted through the same message pathway and the same bus. However, the number of calls that can travel over the same path at the same time, separated from one another in time, is limited. The approximate intelligence-transmitting capacity of the common path is determined by the ratio of the time elapsing between samplings from one call, or one source of intelligence, and the time elapsing between samplings from different calls, or different sources of intelligence. The state-of-the-art of time division telephone multiplex systems thus permits to transmit intelligence derived from 250 sources, the bandwidth of transmitted frequencies being that established by the CCITT. It is expected that this number will increase in the future to 1,000, if and when the performance characteristics of the electronic components required in time division telephone multiplex systems are significantly improved.

It is an important object of this invention to increase the number of messages in a time division telephone multiplex system.

The invention is predicated upon a series-parallel-series conversion of scanning samples of intelligence transmitted in form of pulses. This makes it possible to greatly increase the time intervals between the transmission by the message pathway or bus system of samples pertaining to the same message. As a result, the bus system may be used for transmitting a larger number of messages.

SUMMARY OF INVENTION

A system embodying this invention includes a transmitting station for intelligence and a receiving station for receiving intelligence transmitted from said first mentioned station.

The transmitting station has means for sequentially sampling intelligence to be transmitted and for separately storing the samples.

The receiving station has means for storing separately samples of intelligence and reconstituting the original sequence thereof.

The transmitting station further includes a plurality of switching devices each operatively related to a separate sample storage means in said transmitting station and to one of a plurality of buses.

The receiving station further includes a plurality of switching devices each operatively related to a separate sample storage means in said receiving station and to one of the aforementioned plurality of buses.

Said first plurality of switching devices and said second plurality of switching devices are controlled simultaneously by common control means resulting in simultaneous transmission of a plurality of intelligence samples through said plurality of buses.

DESCRIPTION OF PREFERRED EMBODIMENTS

Figure 1:
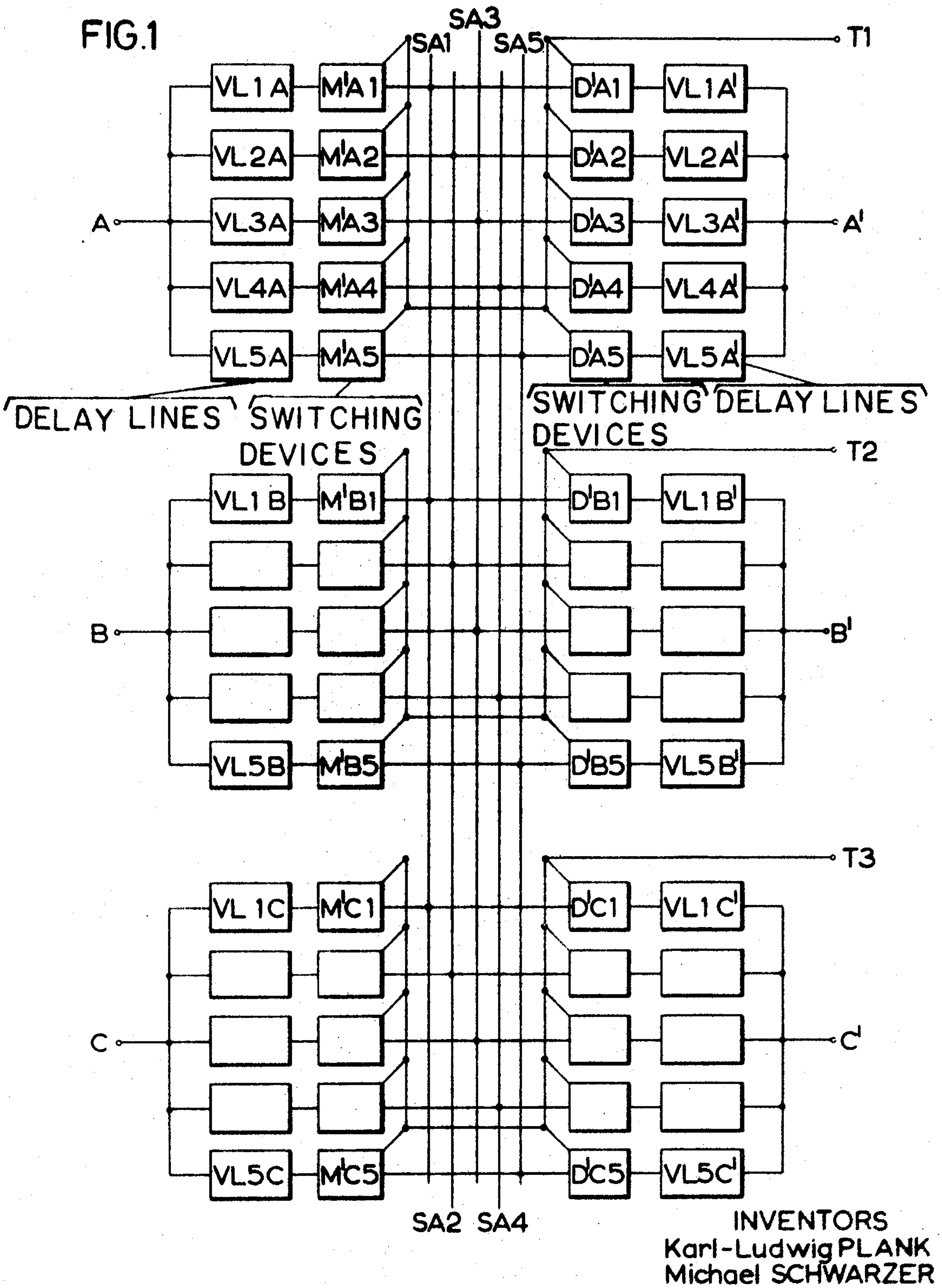
FIG. 1 is a block diagram of a time division multiplexing system embodying the present invention including a plurality of buses and means for achieving different time delays of samples transmitted through a message channel.

In FIG. 1 reference characters A,B and C have been applied to indicate three sources transmitting intelligence, and A',B' and C' have been applied to indicate three correlated receivers of intelligence transmitted from sources A,B,C. Intelligence emanating from source A is intended to be transmitted to A', the intelligence emanating from B to B', and intelligence emanating from C to C'. The coordination of A and A'; B and B'; C and C' is effected by a control system not shown in FIG. 1. Transmission is effected by time division multiplex. The system includes five buses $SA_1$; $SA_2$; $SA_3$; $SA_4$ and $SA_5$. Each of the aforementioned buses has a transmission band A–A'; B–B' and C–C' in accordance with the CCITT speach transmission band. Each transmission channel includes five individual branches. The left side of FIG. 1 shows the modulating means, or sampling means, of the system and the right side shows the demodulating means, or reconstitution means, thereof. Intelligence emanating from A is transmitted to scanning point M'A along a first branch including circuit VL1A without time delay. Intelligence emanating from A and transmitted through a second branch is delayed by delay line VL2A before reaching scanning point M'A2. The delay time may be 125 microseconds. A third branch includes a delay line VL3A interposed between A and scanning point M'A3 causing a delay of say 2×125=250 microseconds. A fourth and fifth branch include delay lines VL4A and VL5A, respectively, interposed between the source A of information and scanning points M'A4 and M'A5, respectively. Delay line VL4A may cause a signal delay of 375 microseconds, and delay line VL5A a delay of 500 microseconds. Each of scanning points M'A1 to M'A5 is a switching device conductively connected to one of the buses SA1 to SA5.

Reference characters D'A1;D'A2; D'A3; D'A4 and D'A5 have been applied to indicate five scanning points situated on the demodulating side of the system each formed by a switching device. A control line $T_1$ is connected to switching devices M'A1–M'A5 and D'A-1–D'A5. A pulse supplied to the scanning points M'A1 . . . M'A5 on the modulating side of the circuitry, and to the scanning points D'B1 . . D'B5 of the demodulating side of the circuitry, results in an output of the last mentioned scanning points made up of five simultaneous samples of the amplitudes of the source of intelligence A, each derived from one of the five parallel branches. To be more specific, the output of D'A1 is equal to the amplitude of the signal at a given time of sampling of A, the output at D'A2 is equal to the amplitude of the signal 125 microseconds prior to the aforementioned given time of sampling of A; the output at D'A3 is equal to the amplitude of the signal 250 microseconds prior to the aforementioned given time of sampling of A; the output at D'A4 is equal to the amplitude of the signal 375 microseconds prior to the aforementioned given time of sampling of A, and the output at D'A5 is equal to the amplitude of the signal 500 microseconds prior to the aforementioned given time of sampling of A. The samples must now be unscrambled or reconstituted in their original sequence. To this end the output signal of scanning point D'A5 is transmitted without time delay to A' by the intermediary of circuit VL5A'. Therefore A' receives the "earliest" amplitude sample emanating from the source of intelligence A. The output signal of scanning point D'A4 is delayed 125 microseconds by means of delay line VL4A'. The signals transmitted through the remaining branches are each delayed 125 additional microseconds. Hence receiver A' receives a sequence of scanning samples spaced 125 microseconds and corresponding to the intelligence emanating from source A.

The pulse supplied to network $T_1$ for controlling the switching devices M'A1–M'A5 and D'A1– D'A5 for the paths of verbal messages must be emitted but in intervals of five times 125 microseconds, i.e. in intervals of 625 microseconds. Hence the buses SA1 to SA5 may put through five times the normal number of messages without limiting their frequency spectrum, or requiring any changes in the control of the system. When transmitting verbal intelligence it is perfectly feasable to admit delay times of 10 milliseconds, and delay times in excess thereof.

In FIG. 1 reference characters VL1B . . . VL5B and VL1C . . . VL5C have been applied to indicate delay lines on the modulating side of the system and reference characters VL1B' . . . VL5B' and VL1C' . . . VL5C' have been applied to indicate delay lines on the demodulating side of the system. M'B1 . . . M'B5 and D'B1 to D'B5 are switches intended to be triggered simultaneously by network $T_2$. M'C1 . . . M'C5 and D'C1 to D'C5 are switches intended to be triggered simultaneously by network $T_3$. The operation of the circuit components referred to in the above paragraph is self-evident.

Figures 2, 3:
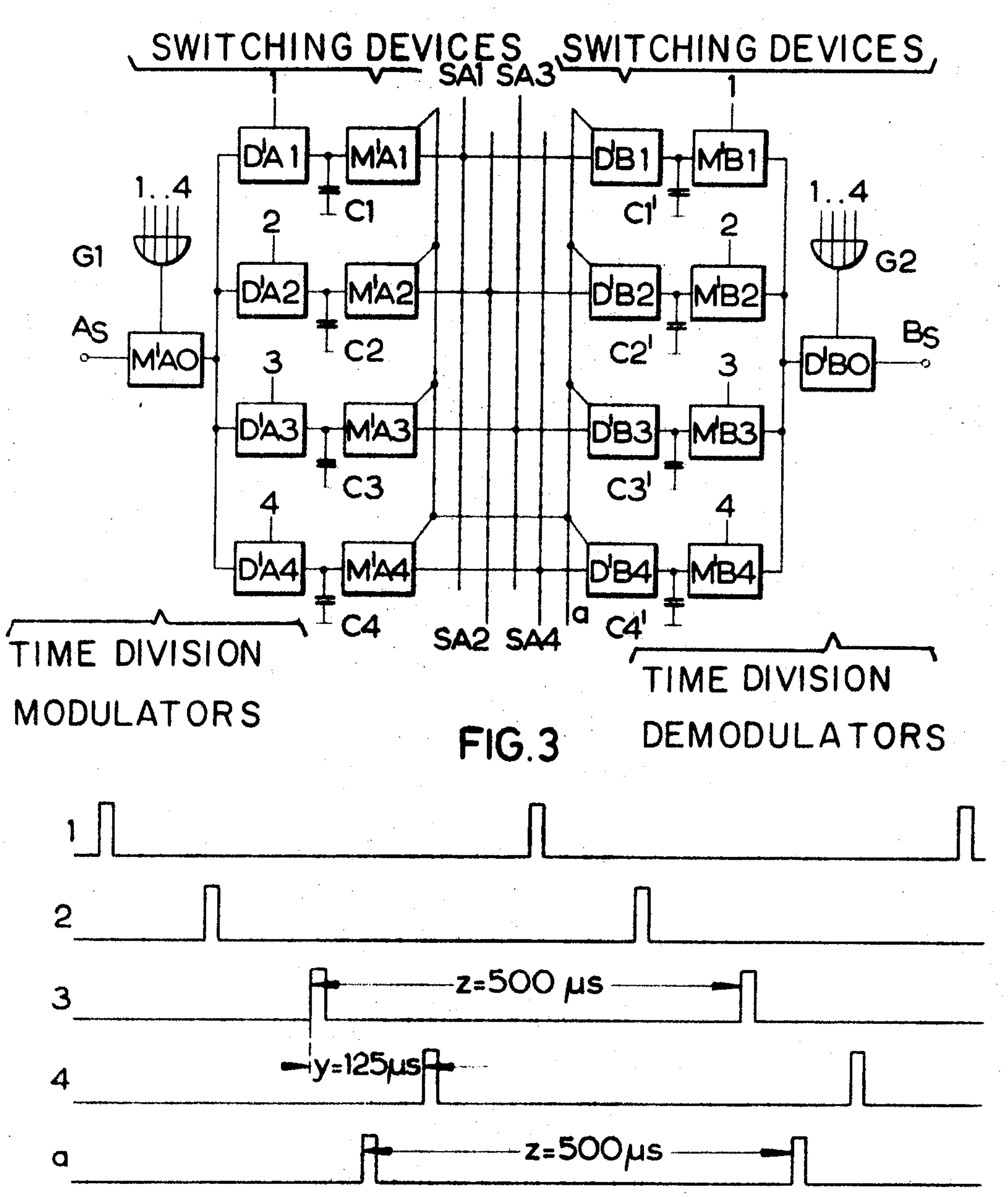
FIG. 2 is a block diagram of another time division multiplexing switching system embodying the present invention including a plurality of buses and means for achieving an intermediate storage of samples transmitted through a message channel.
FIG. 3 is a diagram illustrating sample pulses plotted against time.

In the block diagram according to FIG. 2 the system includes capacitor storage means $C_1$,$C_2$,$C_3$,$C_4$ and $C_1'$,$C_2'$,$C_3'$,$C_4'$ rather than delay line storage means.

FIG. 3 shows the four-phase scanning raster of the circuitry of FIG. 3 established by sequences of pulses 1,2,3,4 and this figure also shows the putting through or transmission raster *a*. The pulses between two consecutive lines of the scanning raster have a phase displacement to which reference character *y* has been applied. The required sampling rate or scanning sequence *y* is determined in accordance with the scanning theorum, and may be 125 microseconds. The displacement *z* between pulses within each line 1,2,3,4 is 4× 125 microseconds = 500 microseconds. The sequences of pulses 1,2,3,4 of the four branches of the system of FIG. 2 have the temporal relation shown in FIG. 3. The pulses of the sequence a of pulses controlling transmission by the four buses SA1,SA2,SA3,SA4 of FIG. 2 have a phase displacement *z*=500microseconds. The train of pulses a has an arbitrary phase relation to the trains of pulses 1,2,3,4.

Assuming that it is intended to transmit intelligence from the source of intelligence AS of FIG. 2 to the receiver BS. The scanning point M'A0 on the modulating side of the system is supplied with series of scanning pulses 1,2,3,4 by the intermediary of an OR gate $G_1$. Hence the output of M'A0 are time separated amplitude samples of the intelligence emanating from AS at intervals of say 125 microseconds. The four resulting scanning samples are supplied in the same fashion to all four scanning points D'A1 to D'A4, each under the control of one train of pulses 1,2,3,4. Thus complex switching circuits and programming means are dispensed with. Capacitor C1 is charged from scanning point D'A1 in the rhythm of the train of pulses 1 with amplitude samples of the message to be transmitted. In like fashion capacitors $C_2$, $C_3$ and $C_4$ are charged with amplitude samples from scanning points D'A2,D'A3 and D'A4 in the rhythm of the trains of pulses 2,3,4. The train of pulses a supplied to line or network *a'* causes all the switching devices M'A1,M'A2,M'A3 and M'A4 on the modulating side of the system and all the switching devices D'B1,D'B2, D'B3 and D'B4 on the demodulating side of the system to close simultaneously. Hence the charges of capacitors $C_1$ to $C_4$ are transmitted as indicated below.

The charge of capacitor $C_1$ is transmitted to capacitor $C_1'$ by the intermediary of switch M'A1, bus SA1 and switch D'B1.

The charge of capacitor $C_2$ is transmitted to capacitor $C_2'$ by the intermediary of switch M'A2, bus SA2 and switch D'B2.

The charge of capacitor $C_3$ is transmitted to capacitor $C_3'$ by the intermediary of switch M'A3, bus SA3 and switch D'B3.

The charge of capacitor $C_4$ is transmitted to capacitor $C_4'$ by the intermediary of switch M'A3, bus SA4 and switch D'B4.

Thus capacitors $C_1'$ to $C_4'$ store simultaneously all scanning samples. These samples are supplied to the demodulator D'B0 on the receiving side of the system in their proper sequence. This is effected by switches M'B1,M'B2,M'B3 and M'B4 each controlled by one of the aforementioned train of pulses 1,2,3,4. The demodulator D'B0 is connected to OR gate $G_2$ whose input is the train of pulses 1 . . . 4 like the aforementioned gate $G_1$ and the output of demodulator D'B0 fed into receiver BS. The latter receives the intelligence originating at AS with a time delay of 500 microseconds. Buses SA1 to SA5 are used for the transmission of intelligence only once in intervals of 500 microseconds. This makes it possible to greatly increase the number of messages that can be transmitted simultaneously.

It will be apparent from the above that systems according to this invention make it possible to increase the duration between transmission pulses. Given a frequency of such pulses, a larger number of individual pathways may be established, provided the number of buses is sufficiently large and provided that the time delays inherent in the system are acceptable. Since these time delays are in the order of delay transmission times of telephone lines, the time delays inherent in the system are not a matter of any moment.

It will be understood that the above description of the invention is intended to be illustrative rather than limiting, as the invention may be variously embodied, and is to be interpreted as claimed.

We claim as our invention:

1. A time division multiplex telephone system with parallel transmission including a. a plurality of transmitting stations each transmitting continuous signals;
b. a plurality of receiving stations each receiving continuous signals from one of said plurality of transmitting stations;
c. a plurality of parallel buses;
d. a plurality of groups of parallel transmission branch circuits, all transmission branch circuits of each of said plurality of groups of transmission branch circuits being connected on one end thereof to one of said plurality of transmitting stations and adapted to store sequential amplitude samples of signals thereof, and each transmission branch circuit of each of said plurality of groups of transmission branch circuits being connected by the intermediary of a switching means to one of said plurality of buses;
e. a plurality of groups of parallel receiving branch circuits, all receiving branch circuits of each of said plurality of groups of receiving branch circuits being connected on one end thereof to one of said plurality of receiving stations and adapted to store amplitude samples of signals and to supply said one of said plurality of receiving stations sequentially with amplitude samples stored therein, and each receiving branch circuit of each of said plurality of groups of receiving branch circuits being connected to one of said plurality of buses by the intermediary of a switching means;
f. time control means causing simultaneous operation of said switching means in all transmission branch circuits of one of said plurality of groups of transmission branch circuits and in all receiving branch circuits of one of said plurality of groups of receiving branch circuits to transmit amplitude samples stored in said one of said plurality of groups of transmission branch circuits simultaneously over said plurality of buses to one of said plurality of groups of receiving branch circuits; and
g. time control means causing sequential operation of said switching means in transmission branch circuits of different of said plurality of groups of transmission branch circuits and in receiving branch circuits of different of said plurality of groups of receiving branch circuits so that amplitude samples derived from different of said plurality of transmitting stations are transmitted sequentially to different of said plurality of receiving stations.

2. A time division multiplex telephone system with parallel transmission including
a. a plurality of transmitting stations each transmitting continuous signals;
b. a plurality of receiving stations each receiving continuous signals from one of said plurality of transmitting stations;
c. a plurality of parallel buses;
d. a plurality of groups of parallel transmission branch circuits, the constituent branch circuits of each of said plurality of groups of transmission branch circuits being connected at one end thereof to one of said plurality of transmitting stations and the constituent branch circuits of each of said plurality of groups of transmission branch circuits including serially arranged time delay lines and switching means, said time delay lines of the branch circuits of each group of said plurality of groups of transmission branch circuits having time delays graded in equal intervals, and said switching means of each of said transmission branch circuits of each of said plurality of groups of transmission branch circuits being connected by the intermediary of said switching means thereof to one of said plurality of buses;
e. a plurality of groups of parallel reception branch circuits, the constituent branches of each of said plurality of groups of reception branch circuits being connected at one end thereof to one of said plurality of receiving stations and the constituent branches of each of said plurality of groups of reception branch circuits including serially arranged time delay lines and switching means, said time delay lines of said reception branch circuits of each group of said plurality of groups of reception branch circuits having time delays graded in equal intervals and the constituent reception branch circuits of each of said plurality of groups of reception branch circuits being connected by the intermediary of said switching means thereof to one of said plurality of buses in such a way that said plurality of buses connect branch circuits of said plurality of groups of transmission branch circuits having relatively short delay times to branch circuits of said plurality of groups of reception branch circuits having relatively long delay times;
f. time control means causing simultaneous operation of said switching means in each transmission branch circuit of one of said plurality of groups of transmission branch circuits and of said switching means in each reception branch circuit of one of said plurality of groups of reception branch circuits to transmit amplitude samples of signals from one of said plurality of transmitting stations simultaneously in parallel over said plurality of buses to one of said plurality of groups of receiving branch circuits and from said one of said plurality of groups of receiving branch circuits sequentially in series to one of said plurality of receiving stations; and
g. time control means causing sequential operation of said switching means in different groups of said plurality of groups of transmission branch circuits and in different groups of said plurality of groups of reception branch circuits so that amplitude samples from different of said plurality of transmitting stations are sequentially transmitted over said plurality of buses to different of said plurality of receiving stations.

3. A time division multiplex telephone system with parallel transmission including
a. a transmitting station transmitting continuous signals;
b. a receiving station receiving continuous signals from said transmitting station;
c. a plurality of parallel buses;
d. a plurality of parallel transmitting branch circuits to be connected to said transmitting station, each of said transmitting branch circuits including an amplitude sample storage capacitor, a first switching means for connecting said capacitor to said transmitting station and a second switching means for connecting said capacitor to one of said plurality of buses;
e. a plurality of parallel receiving branch circuits to be connected to said receiving station each including an amplitude sample storage capacitor, a first switching means for connecting said capacitor to one of said plurality of buses and a second switching means for connecting said capacitor to said receiving station;

f. first time control means controlling said first switching means in each of said plurality of transmitting branch circuits and controlling said second switching means in each of said plurality of receiving branch circuits to cause said capacitor in each of said plurality of transmitting branch circuits to be charged sequentially with amplitude samples derived from said transmitting station and to cause said capacitor in each of said plurality of receiving branch circuits to sequentially discharged amplitude samples stored therein to said receiving station; and g. second time control means controlling said second switching means in each of said plurality of receiving branch circuits and controlling said first switching means in each of said plurality of receiving branch circuits to cause simultaneous parallel transmission of amplitude samples stored in said capacitor of each of said plurality of transmission branch circuits over said plurality of buses to said capacitor in each of said receiving branch circuits.

* * * * *

PO-1050
(5/69)

UNITED STATES PATENT OFFICE
CERTIFICATE OF CORRECTION

Patent No. 3,740,482 Dated June 19, 1973

Inventor(s) Plank et al

It is certified that error appears in the above-identified patent and that said Letters Patent are hereby corrected as shown below:

Cover page, left column , insert after line 10

" Foreign Application Priority Data

May 22, 1968 Germany ------- P 17 62 310. 8 "

Signed and sealed this 27th day of November 1973.

(SEAL)
Attest:

EDWARD M.FLETCHER,JR.
Attesting Officer

RENE D. TEGTMEYER
Acting Commissioner of Patents